United States Patent Office 2,937,073
Patented May 17, 1960

2,937,073

PROCESS FOR ELUTING PENTAVALENT VANADIUM VALUES FROM ION EXCHANGE RESINS

Daniel C. McLean, Springdale, Conn., assignor to American Cyanamid Company, New York, N.Y., a corporation of Maine No Drawing. Application August 9, 1955
Serial No. 527,401

4 Claims. (Cl. 23—19)

This invention relates to an improved method of eluting vanadium adsorbed on anion exchange resins.

While the adsorption of vanadium by anion exchange resins was not a commercially practical process until the development of the process described and claimed in my copending application, Serial No. 527,400, filed August 9, 1953, in which the adsorption of the vanadium from feed liquor containing it in high concentration was effected at a temperature below that at which insoluble polyvanadate precipitation took place and preferably at temperatures not exceeding 40° C. followed in series by further resin beds maintained at high temperatures, attempts were made to elute vanadium adsorbed on anion exchange resins. One of these attempts involved the use of an aqueous sulfurous acid solution which reduced the pentavalent vanadium adsorbed on the resin to vanadyl sulfate which was soluble in the eluate. This proposed method of elution, however, ran into serious operational problems. The reaction taking place during elution by which the pentavalent vanadium is reduced to the tetravalent form consumed sulfurous acid with the result that the pH of the solution rose, and usually hydrolysis set in, resulting in the precipitation of vanadium compounds in the resin in a form in which they could not readily be removed. It was only possible to avoid this difficulty by the use of a very large volume of the eluting liquid. This is feasible in the laboratory but is impractical in commercial use because the extremely dilute eluate obtained contains a very large amount of $SO_2$ which has to be destroyed by oxidation and renders the cost of operation prohibitive.

According to the present invention the elution with sulfurous acid is effected without undesirable precipitation. I have found that this result may be obtained by greatly increasing the rate at which the sulfurous acid solution is circulated through the resin containing the adsorbed vanadium, until such time as the vanadium content of the resin is markedly lowered, at which point a slower elution does not result in precipitation.

The rapid elution which is kept at a rate above that causing precipitation, and in practical operation will preferably result in a contact time of the order of a minute or even less, does not produce a dilute eluate because recycling is used until the vanadium content in the eluate has built up to the point at which $SO_2$ losses in the final recovery are not serious. Preferably the elution is continued until the vanadium content in the eluate reaches a value up to 90 grams per liter (which throughout the specification will be abbreviated as g./l.). In recycling care should be taken to keep the pH of the eluting solution from rising too high. This can be effected very easily by the addition of small amounts of sulfuric acid. The pH should be kept well below 2, but if the pH falls too low, that is below about 1.3, the solubility of the $SO_2$ becomes too low and during recycling, its evolution as a gas introduces an operating nuisance, requiring scrubbing facilities and the like.

When a resin bed or column with a heavy vanadium loading is first eluted by rapid recycling of the eluant, if necessary with pH adjustment, a high concentration of vanadium in the eluate is obtained for the vanadium adsorbed on the outer surfaces of the resin beads elutes comparatively very rapidly whereas the vanadium which is more deeply imbedded comes out quite slowly. The strong eluate containing high vanadium content is sent to vanadium recovery where the vanadium is oxidized to the point where it precipitates as a polyvanadate referred to in the art as "red cake." $SO_2$ losses per unit of vanadium recovered are comparatively small. As the vanadium content of the resin decreases, elution can be slower without hydrolysis and is carried out until the vanadium content of the resin has been brought down to the desired minimum. In these latter stages in the interest of output there should be sufficient volume of sulfurous acid solution so that it is present in large excess; or, to put it in other terms, an eluate is produced which has a relatively low vanadium content. In the case of the last of the eluate this may be as little as 5% or less of the vanadium content of the earlier eluates. To oxidize such a dilute solution in order to precipitate the vanadium as polyvanadate would result in serious losses of $SO_2$ and excessive consumption of oxidizing agent. This disadvantage is smaller although not quite so serious than that encountered when very large volumes of eluant are used from the beginning as was necessary in the former process. Therefore, it is preferable to use the later eluates with small vanadium contents as part or all of the eluant used with the next batch of vanadium-loaded resin. Of course, fortification with additional $SO_2$ and adjustment of pH should first take place. In this way the $SO_2$ content of the later eluates is effectively utilized.

The invention will be described in greater detail in conjunction with the following specific examples.

*Example 1*

A strong base anion resin of the quaternary ammonium polystyrene-divinyl benzene type described in U.S. Patent No. 2,591,573 and sold by Rohm and Haas under the designation XE–123 having a resin loading in g./l. of 232 $V_2O_5$ and 8 Fe was eluated with 2.8 column volumes of an eluant of pH 1.0 containing 60 g./l. $SO_2$. The eluant was passed through the resin bed as fast as it would flow with an average retention time of approximately 1 minute. The eluant was recycled with adjustment of pH until the odor of $SO_2$ was no longer noticeable. The eluate contained in g./l. 88.6 $V_2O_5$ and 3.65 Fe. This eluate was oxidized with sodium chlorate and adjusted with alkali until the vanadium precipitated as red cake.

Meanwhile a second 2.8 column volumes of eluant was recycled through the resin, the pH being maintianed at 0.75. The contact time remained about 1 minute. Recycling was continued as before until the odor of $SO_2$ was no longer noticeable. An eluate was produced containing in g./l. 26.6 $V_2O_5$ and 0.4 Fe. This fraction of eluate was likewise oxidized as described above to precipitate red cake.

A third 2.8 column volumes of eluant was recycled at a slower rate with about a 10 minute contact time. The pH was maintained at 1.5. An eluate was produced containing 1.2 g./l. $V_2O_5$ and negligible Fe. The third elution exhausted substantially all of the vanadium from the resin which was then used as an adsorbing resin in another cycle. The last eluate was fortified with $SO_2$ to bring it up to 60 g./l. and the pH adjusted to 1. It was then used to elute a fresh batch of resin, the cycles being repeated.

Example 2

A second batch of the resin of Example 1 having a $V_2O_5$ loading of 243 g./l. with 14 g./l. Fe was eluted with 2 column volumes of an eluant as described in Example 1, the contact time being 1 minute as before, and the pH maintained at .65. An eluate was produced having a composition in g./l. $V_2O_5$ 91.9 and Fe 5.55. The eluate was set to vanadium recovery as described in Example 1 and a second 2 column volumes of eluant was recycled through the resin as described in Example 1 maintaining a pH of .55. The resulting eluate containing in g./l. 28.8 $V_2O_5$ and 1.4 Fe. It was likewise oxidized to recover the vanadium. The last eluant which was again 2 column volumes was recycled with an average contact time of about 8–10 minutes, pH being maintained at 1.5. After substantially all of the vanadium had been eluted, an eluate was produced with 1.0 g./l. $V_2O_5$ and negligible Fe. This eluate after fortification with $SO_2$ and pH adjustment was reused with a fresh batch of resin as described in Example 1.

Example 3

A resin as described in Examples 1 and 2 containing 135 g./l. $V_2O_5$ and 4 g./l. Fe was eluted with 2 column volumes of eluant as described in Examples 1 and 2, the contact time being substantially the same, and the pH being maintained at 0.7. An eluate was produced containing in g./l. 65.7 $V_2O_5$ and 2.05 Fe.

A second elution was effected with a contact time of 8–10 minutes and a pH maintained at 1.5. An eluate was produced containing in g./l. 2.31 $V_2O_5$ and 0.1 Fe. After fortification with $SO_2$ and adjustment of pH this was reused as an eluant for a fresh batch of resin as described in the preceding examples.

In the examples the last elution has been described as a recycling with a relatively long retention time. Where the equipment makes it desirable, it is possible to obtain substantially the same result by allowing the eluant simply to remain in contact with the resin until the resin is substantially exhausted. This will usually require a time of the order of 1–3 hours and is somewhat slower than the procedure described in the example where the eluant is slowly recycled through the resin.

I claim:
1. A method of eluting pentavalent vanadium values adsorbed on anion exchange resins which comprises eluting a portion of the vanadium values from the resin with a strongly acid aqueous sulfurous acid solution having a pH below 2, the rate of elution being in excess of that at which any vanadium compound is precipitated in the resin in unelutable form, such precipitation resulting from slow elution, adding sufficient acid to the eluate to maintain the pH between 1.3 and 2, maintaining elution at the above-defined rate until the vanadium radical content of the anion exchange resin is reduced to a point at which the said slow elution does not precipitate a vanadium compound in unelutable form and recycling the eluate while maintaining the pH between 1.3 and 2 until the vanadium radical content of the resin has been substantially eluted and recovering vanadium compounds from the eluate by precipitation.

2. The process of claim 1 in which the pH is adjusted during the elution by the addition of small amounts of sulfuric acid.

3. The process of claim 1 in which the recycled strongly acid aqueous sulfurous acid solution has a pH above 1.3 and below 2.

4. A process according to claim 1 in which the recycling with small amount of eluant is maintained until the major proportion of the vanadium containing radical has been eluted to form a concentrated eluate and the elution is then completed with larger volumes of eluant to produce a relatively dilute eluate and the dilute eluate produced is used in the elution of fresh batches of resin after adjustment of sulfurous acid content and of the pH to below 2.

References Cited in the file of this patent

McLean et al. in U.S. Atomic Energy Commission publication ACCO–63, July 30, 1954 (note especially pages 23, 28 and 48).

Abrams et al. in U.S. Atomic Energy Commission publication ACCO–53, July 10, 1954.

Salmon et al.: "Journal of the Chemical Society" (1952), pages 2324–2326.

Sussman et al.: "Industrial and Engineering Chemistry," vol. 37, No. 7, pages 618–624.